United States Patent
Wiborg

(10) Patent No.: US 9,903,527 B1
(45) Date of Patent: Feb. 27, 2018

(54) SCRAPER TRACTOR STAND DEVICE AND ASSOCIATED METHOD

(76) Inventor: Corey Wiborg, Somonauk, IL (US)

(*) Notice: Subject to any disclaimer, the term of this patent is extended or adjusted under 35 U.S.C. 154(b) by 489 days.

(21) Appl. No.: 12/858,736

(22) Filed: Aug. 18, 2010

Related U.S. Application Data

(60) Provisional application No. 61/234,679, filed on Aug. 18, 2009.

(51) Int. Cl.
| | | |
|---|---|---|
| *A47K 1/04* | (2006.01) | |
| *F16M 11/20* | (2006.01) | |
| *B66F 5/00* | (2006.01) | |
| *F16M 3/00* | (2006.01) | |
| *B25H 1/00* | (2006.01) | |

(52) U.S. Cl.
CPC .............. *F16M 11/20* (2013.01); *B66F 5/00* (2013.01); *B25H 1/0007* (2013.01); *F16M 3/00* (2013.01)

(58) Field of Classification Search
CPC .. F16M 11/20; F16M 3/00; B66F 5/00; B25H 1/0007
USPC .... 248/128–130, 351, 352, 124.2, 142, 544, 248/637, 646, 670, 676, 157; 280/6.15; 269/17; 254/2 B, 133 A
See application file for complete search history.

(56) References Cited

U.S. PATENT DOCUMENTS

| | | | | |
|---|---|---|---|---|
| 394,439 A | * | 12/1888 | Beckert | 248/129 |
| 949,331 A | * | 2/1910 | Scholle | B66F 5/04 |
| | | | | 254/2 B |
| 1,505,586 A | * | 8/1924 | Corley | E21C 11/00 |
| | | | | 248/646 |
| 2,446,518 A | * | 8/1948 | Arnold | B62B 3/10 |
| | | | | 248/129 |
| 3,170,708 A | * | 2/1965 | Miller | B62B 5/0083 |
| | | | | 24/525 |
| 3,949,976 A | * | 4/1976 | Cofer | B66F 5/00 |
| | | | | 254/134 |
| 4,687,215 A | * | 8/1987 | Brendgord | B62B 3/10 |
| | | | | 211/126.1 |
| 4,799,656 A | | 1/1989 | Puskarich | |
| 4,804,162 A | * | 2/1989 | Rice | B25H 1/0007 |
| | | | | 248/129 |
| 4,932,628 A | * | 6/1990 | Pacheco | B25H 1/0007 |
| | | | | 248/129 |
| 4,971,286 A | * | 11/1990 | Silhan | B25H 1/0007 |
| | | | | 248/129 |

(Continued)

*Primary Examiner* — Christopher Garft
(74) *Attorney, Agent, or Firm* — Najafi Law, P.A.; Ashkan Najafi

(57) ABSTRACT

A scraper tractor stand may include a plurality of linear central support beams adapted to be positioned underneath the heavy-duty equipment. A portable first support section may be connected to a respective proximal end of each of the central support beams. The first support section has a first cross-beam registered along a first x-axis. The first cross-beam may be fixedly connected to the heavy-duty equipment. A portable second support section may be connected to a respective distal end of each of the central support beams. The second support section has a second cross-beam registered along a second x-axis. Each of the first and second cross-beams may be independently adjustable along mutually exclusive first and second y-axes respectively. The central support beams may further be coplanar and aligned along a horizontal plane oriented perpendicular to the first and second y-axes respectively.

8 Claims, 4 Drawing Sheets

(56) References Cited

U.S. PATENT DOCUMENTS

| | | | | |
|---|---|---|---|---|
| 6,092,768 | A * | 7/2000 | Larson | B08B 3/026 |
| | | | | 248/129 |
| 6,676,361 | B2 * | 1/2004 | Libler | B60P 1/04 |
| | | | | 298/17 B |
| 6,854,314 | B2 * | 2/2005 | Cleave | B21D 5/04 |
| | | | | 144/286.1 |
| 7,810,799 | B2 * | 10/2010 | McGloghlon | B25H 1/0007 |
| | | | | 248/676 |
| 2008/0087792 | A1 * | 4/2008 | Evitt, Sr. | B25H 1/0007 |
| | | | | 248/676 |
| 2012/0256060 | A1 * | 10/2012 | West | B65G 7/04 |
| | | | | 248/157 |

* cited by examiner

US 9,903,527 B1

SCRAPER TRACTOR STAND DEVICE AND ASSOCIATED METHOD

CROSS REFERENCE TO RELATED APPLICATIONS

This application claims the benefit of U.S. Provisional Application No. 61/234679, filed Aug. 18, 2009, the entire disclosures of which are incorporated herein by reference.

STATEMENT REGARDING FEDERALLY SPONSORED

RESEARCH OR DEVELOPMENT

Not Applicable.

REFERENCE TO A MICROFICHE APPENDIX

Not Applicable.

BACKGROUND OF THE INVENTION

Technical Field

This invention relates to construction equipment and, more particularly, to a scraper tractor stand device for providing users with a safe means of lifting heavy construction equipment for performing repairs and maintenance work.

Prior Art

Heavy vehicles and mobile equipment are indispensable to many industrial activities, from construction to railroads. Various types of equipment move materials, till land, lift beams, and dig earth to pave the way for development and production. Over 1,000 construction workers are killed each year, many of whom would now be alive if not for the failure of a manufacturer to provide safe equipment or for the negligence of those responsible for repair and maintenance of equipment. Everything from cranes to forklifts to scaffolding and ladders can cause potentially fatal accidents.

The size and power of the machines and equipment used in the construction industry can be responsible for some of the most heinous injuries if not used carefully and professionally. Construction equipment and unsafe tools can experience mishap and failure particularly if it is overused or improperly maintained. One of the larger pieces of equipment used in the construction industry is the tractor scraper, a machine that can be risky to work on, especially when performing maintenance actions on the underside. The wheel tractor-scraper is a piece of heavy equipment used for earth moving. The rear part has a vertically moveable hopper (also known as the bowl) with a sharp horizontal front edge. The hopper can be hydraulically lowered and raised. When the hopper is lowered, the front edge cuts into the soil or clay like a cheese-plane and fills the hopper. When the hopper is full it is raised, and closed with a vertical blade (known as the apron). The scraper can transport its load to the fill area where the blade is raised, the back panel of the hopper, or the ejector, is hydraulically pushed forward and the soil or clay load tumbles out. Then the empty scraper returns to the cut site and repeats the cycle. Scrapers can be very efficient on short hauls where the cut-and-fill areas are close together and have sufficient length to fill the hopper. The heavier scraper types have two engines, one driving the front wheels, one driving the rear wheels, with engines up to 550 horsepower. As noted earlier working on the underside of a tractor scraper is risky.

Accordingly, a need remains for a device in order to overcome the above-noted shortcomings. The present invention satisfies such a need by providing a scraper tractor stand that is convenient and easy to use, is durable yet lightweight in design, is versatile in its applications, and provides a safe and effective means of lifting and supporting heavy construction equipment so that repairs and maintenance may be performed.

BRIEF SUMMARY OF THE INVENTION

In view of the foregoing background, it is therefore an object of the present invention to provide an apparatus for supporting a heavy-duty equipment at an elevated position above a ground-surface during maintenance procedures. These and other objects, features, and advantages of the invention are provided by a scraper tractor stand.

The scraper tractor stand may include a plurality of linear central support beams adapted to be positioned underneath the heavy-duty equipment. A portable first support section may be connected to a respective proximal end of each of the central support beams. The first support section preferably has a first cross-beam registered along a first x-axis defined at the proximal ends of the central support beams. The first cross-beam may be adapted to be fixedly connected to the heavy-duty equipment. A portable second support section may be connected to a respective distal end of each of the central support beams. The second support section preferably has a second cross-beam registered along a second x-axis defined at the distal ends of the central support beams.

Each of the first and second cross-beams may be independently adjustable along mutually exclusive first and second y-axes oppositely located at the proximal and distal ends of the central support beams respectively. The central support beams may further be coplanar and aligned along a horizontal plane oriented perpendicular to the first and second y-axes respectively. Such a structural arrangement provides the unexpected and unpredictable advantage of adjustably adapting the stand to a variety of scraper tractors or heavy construction equipment sizes. The adjustable first and second cross-beams further enable the scraper tractor to be raised to a suitable height to allow maintenance work to be performed at a bottom location of the equipment easily and conveniently.

The central support beams may include first and second central support beams statically positioned along the horizontal plane while the first cross-beam is raised and lowered along the first y-axis. Such an arrangement provides the unexpected and unpredictable advantage of raising and lowering the first cross-beam without affecting the stability of the stand.

The portable first support section may include a plurality of first wheel brackets and may further be statically mated to the proximal ends of the central support beams. A plurality of first wheels may be rotatably coupled to the first wheel brackets respectively. A plurality of vertically oriented first linear shafts may be statically and fixedly mated to the first wheel brackets and extending vertically upwardly therefrom. A plurality of mounting brackets may further be adjustably coupled to the first linear shafts and situated therebetween respectively.

The mounting brackets may further be selectively raised and lowered along the first y-axis. A first support plate may be fixedly attached to a top surface of the first cross-beam. Such an arrangement provides the unexpected and unpredictable advantage of easily securing a scraper tractor to the first support section by placing the bottom portion of the scraper tractor onto the first support plate and detachably mating the tractor securing brackets to the mounting brackets respectively. The rotatable first wheels further enables the stand to be easily positioned during operating conditions when mounting a scraper tractor for repairs as well as being portable during non operating conditions respectively.

Each of the mounting brackets may include a body provided with a plurality of fingers vertically spaced therealong and protruding inwardly towards a center-point of the first cross-beam such that a plurality of fasteners may penetrate through each of the fingers respectively. A female base may be selectively positioned along a vertical longitudinal length of a corresponding one of the first linear shafts. Each of the mounting brackets may be independently adjusted along the corresponding first linear shafts. Such an arrangement provides the unexpected and unpredictable advantage of enabling the first support section to be adaptably affixed to a variety of different height locations of a scraper tractor securing brackets. The fingers further enable a flexible arrangement such that the mounting brackets may be affixed to a rigid scraper tractor securing bracket without the risk of loosening during operating conditions.

The second support section 21 may include a plurality of primary linear leg members 35 spaced apart and aligned parallel to the central support beams 22, 23 respectively. The primary linear leg members 35 may be coupled to the central support beams 22, 23 and may be axially aligned therewith along corresponding linear paths respectively. A secondary linear leg member 36 may be intercalated between the primary linear leg members 35 and registered orthogonal thereto respectively. Such primary and secondary linear leg members 35, 36 may further be coplanar to each other. Such an arrangement provides the unexpected and unpredictable advantage of enabling the central support beams 22, 23 to be slidingly engaged with the primary linear leg members 35 and allow the length of the stand 10 to be linearly adjusted to accommodate various lengths of scraper tractors to be mounted.

The portable second support section may include a plurality of second wheel brackets statically mated to axially opposed ends of the primary linear leg members respectively. A plurality of second wheels may be rotatably coupled to the second wheel brackets respectively. A plurality of vertically oriented second linear shafts may be statically and fixedly mated to the second wheel brackets and extending vertically upward therefrom. A second support plate may be fixedly attached to a top surface of the second cross-beam. The second cross-beam may further be vertically adjustable along respective longitudinal lengths of the second linear shafts and second the second y-axis respectively. Such an arrangement provides the unexpected and unpredictable advantage of independently using the portable second support section to mount smaller and lighter equipment as well as adaptably combining with the portable first support section to mount larger and heavier scraper tractors.

The invention may include a method of utilizing a scraper tractor stand for supporting a heavy-duty equipment at an elevated position above a ground-surface during maintenance procedures. Such a method may include the chronological steps of: providing and positioning a plurality of linear central support beams underneath the heavy-duty equipment; providing and connecting a portable first support section to a respective proximal end of each of the central support beams; providing and registering a first cross-beam along a first x-axis defined at the proximal ends of the central support beams; providing and connecting a portable second support section to a respective distal end of each of the central support beams; providing and registering a second cross-beam along a second x-axis defined at the distal ends of the central support beams; fixedly connecting the first cross-beam to the heavy-duty equipment; independently adjusting each of the first and second cross-beams along mutually exclusive first and second y-axes oppositely located at the proximal and distal ends of the central support beams respectively; and aligning the central support beams at a coplanar configuration and along a horizontal plane oriented perpendicular to the first and second y-axes respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
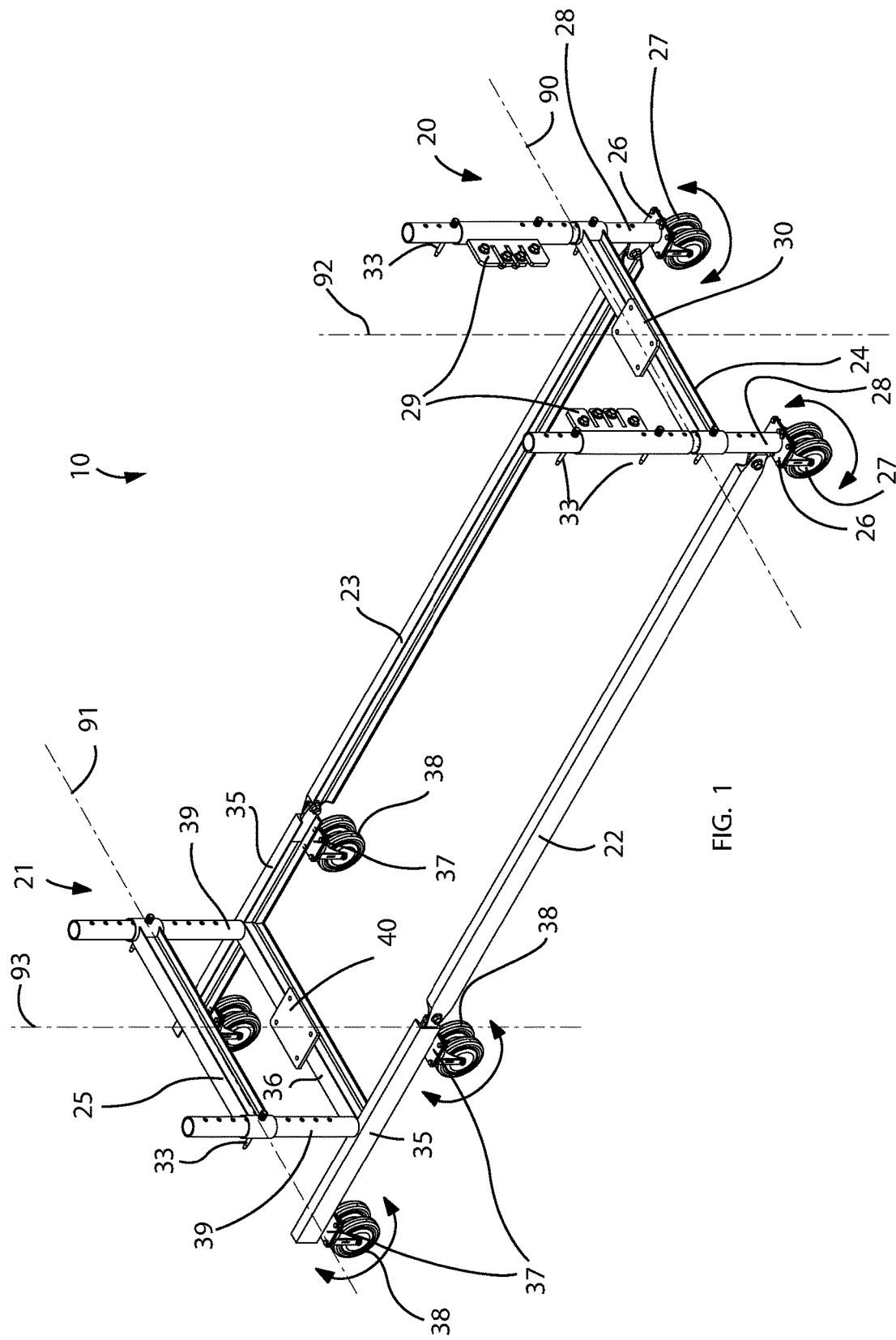
FIG. 1 is a perspective view showing a scraper tractor stand, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The device of this invention is referred to generally in FIGS. 1-4 and is intended to provide a scraper tractor stand. It should be understood that the present invention may be used to lift and support many different types of tractors, bull-dozers and other heavy construction equipment, and the like, and should not be limited to the uses described herein.

Referring generally to FIGS. 1-4, the scraper tractor stand 10 may include a plurality of linear central support beams 22, 23 adapted to be positioned underneath the heavy-duty equipment (not shown). A portable first support section 20 may be connected to a respective proximal end of each of the central support beams 22, 23. The first support section 20 preferably has a first cross-beam 24 registered along a first x-axis 90 defined at the proximal ends of the central support beams 22, 23. The first cross-beam 24 may be adapted to be fixedly connected to the heavy-duty equipment by positioning the first cross-beam 24 beneath the heavy-duty equipment. A portable second support section 21 may be connected to a respective distal end of each of the central support beams 22, 23. The second support section 21 preferably has a second cross-beam 25 registered along a second x-axis 91 defined at the distal ends of the central support beams 22, 23. Such a structural configuration provides the unexpected and unpredictable result of enabling a user to maneuver the scraper tractor stand 10 from either end of the central support beams 22, 23 without shifting the weight of the heavy-duty equipment of balance during transport.

Each of the first and second cross-beams 24, 25 may be independently adjustable along mutually exclusive first and second y-axes 92, 93 oppositely located at the proximal and distal ends of the central support beams 22, 23 respectively. The central support beams 22, 23 may further be coplanar and aligned along a horizontal plane oriented perpendicular to the first and second y-axes 92, 93, respectively. Such a structural arrangement provides the unexpected and unpredictable advantage of adjustably adapting the scraper tractor stand 10 for support a variety of heavy-duty construction equipments. The adjustable first and second cross-beams 24, 25 further enable the scraper tractor stand 10 to be raised to a suitable height to allow maintenance work to be easily and conveniently performed at a bottom location of the scraper tractor stand 10.

As shown in FIG. 1, the central support beams may include first and second central support beams 22, 23 statically positioned along the horizontal plane while the first cross-beam 24 is raised and lowered along the first y-axis 92. Such an arrangement provides the unexpected and unpredictable advantage of raising and lowering the first cross-beam 24 without affecting the horizontal alignment of the first and second central support beams 22, 23 above a ground surface.

Figure 2:
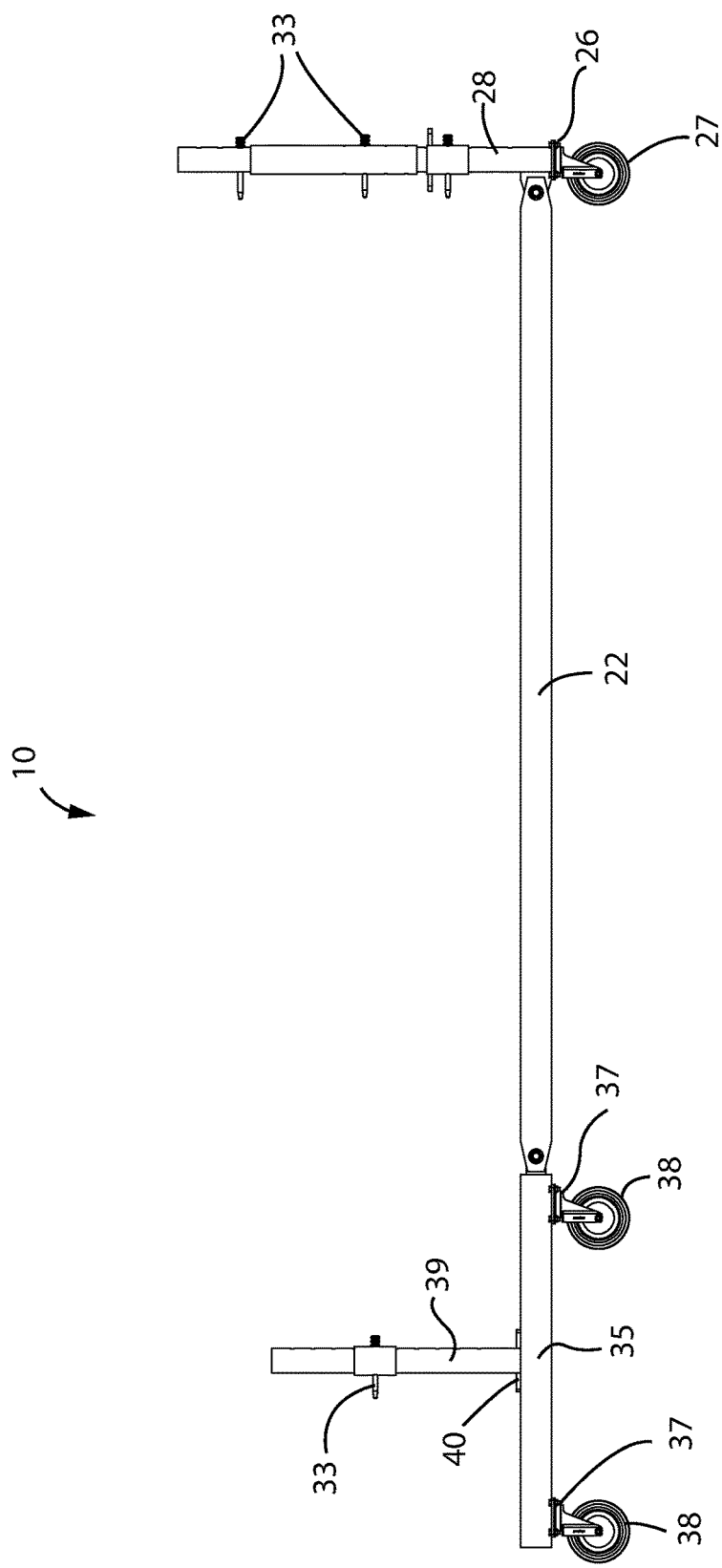
FIG. 2 is a side elevational view of the apparatus shown in FIG. 1.
Figure 3:
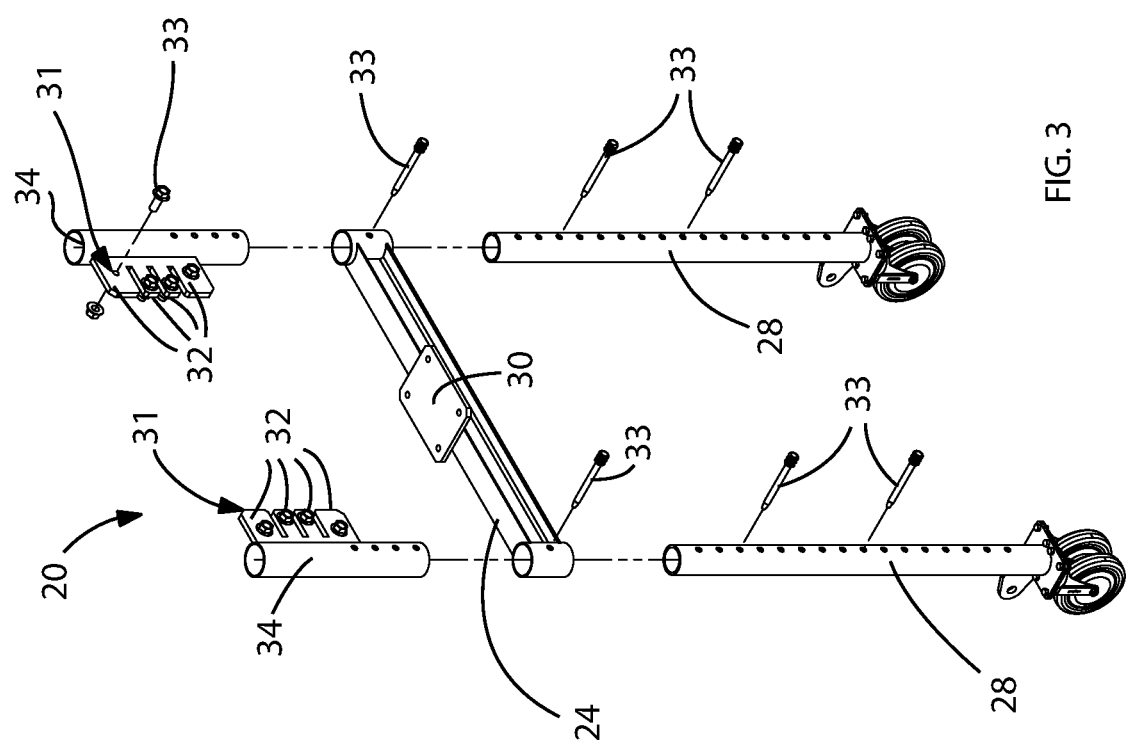
FIG. 3 is a perspective view of the portable first support section.

Referring to FIGS. 1-3, the portable first support section 20 may include a plurality of first wheel brackets 26 and may further be statically mated to the proximal ends of the central support beams 22, 23. A plurality of first wheels 27 may be rotatably coupled to the first wheel brackets 26, respectively. A plurality of vertically oriented first linear shafts 28 may be statically and fixedly mated to the first wheel brackets 26 and extending vertically upwardly therefrom. By statically mating the first linear shafts 28 to first wheel brackets 26, the rigidity and vertically alignment of the first support section 20 is maintained during repair operations.

A plurality of mounting brackets 29 may be adjustably coupled to the first linear shafts 28 and situated therebetween respectively. The mounting brackets 29 may be selectively raised and lowered along the first y-axis 92. A first support plate 30 may be fixedly attached to a top surface of the first cross-beam 24. Such an arrangement provides the unexpected and unpredictable advantage of easily securing first cross-beam 24 to the first support section 20 by placing the bottom portion of the heavy-duty equipment onto the first support plate 30 and detachably mating the mounting brackets 29 to the heavy-duty equipment, respectively. The rotatable first wheels 27 further enables the scraper tractor stand 10 to be easily positioned during operating conditions when mounting the heavy-duty equipment for repairs as well as being portable during non operating conditions respectively.

Referring to FIG. 3, each of the mounting brackets 29 may include a body 31 provided with a plurality of fingers 32 vertically spaced therealong and protruding inwardly towards a center-point of the first cross-beam 24. A plurality of fasteners 33 may further penetrate through each of the fingers 32, respectively. A female base 34 may be selectively positioned along a vertical longitudinal length of a corresponding one of the first linear shafts 28. Each of the mounting brackets 29 may be independently adjusted along the corresponding first linear shafts 28. Such an arrangement provides the unexpected and unpredictable advantage of enabling the first support section 20 to be adaptably affixed to a variety of different heights relative to the bottom surface of the heavy-duty equipment, for example. The fingers 32 further enable a flexible arrangement such that the mounting brackets 29 may be affixed to a non-planar surface of the heavy-duty equipment without the risk of losing leverage and a secure connection with the heavy-duty equipment.

Figure 4:
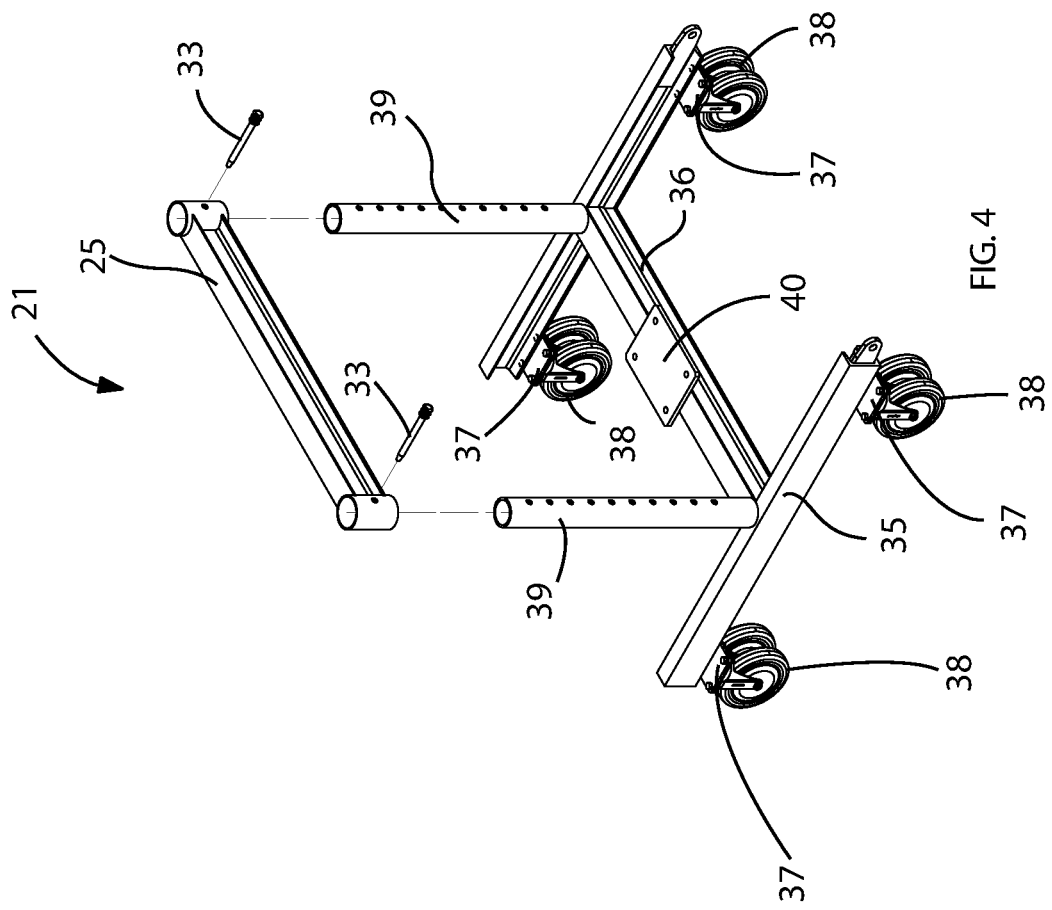
FIG. 4 is a perspective view of the portable second support section.

Referring to FIGS. 1, 2 and 4, the second support section 21 may include a plurality of primary linear leg members 35 spaced apart and aligned parallel to the central support beams 22, 23, respectively. The primary linear leg members 35 may be coupled to the central support beams 22, 23 and may be axially aligned therewith along corresponding linear paths respectively. A secondary linear leg member 36 may be intercalated between the primary linear leg members 35 and registered orthogonal thereto respectively. Such primary and secondary linear leg members 35, 36 may be coplanar to each other. Such an arrangement provides the unexpected and unpredictable advantage of enabling the central support beams 22, 23 to remain axially aligned with the primary linear leg members 35 and thereby ensure the second support section 21 is axially opposed with the first support section 20. This alignment ensures the weight of the heavy-duty equipment remains centrally balanced along a longitudinal length of the scraper tractor stand 10.

As shown in FIG. 4, the portable second support section 21 may include a plurality of second wheel brackets 37 statically mated to axially opposed ends of the primary linear leg members 35, respectively. A plurality of second wheels 38 may be rotatably coupled to the second wheel brackets 37, respectively. A plurality of vertically oriented second linear shafts 39 may be statically and fixedly mated to the second wheel brackets 37 and extending vertically upward therefrom. A second support plate 40 may be fixedly attached to a top surface of the second cross-beam 25. The second cross-beam 25 may be vertically adjustable along respective longitudinal lengths of the second linear shafts 39 and second the second y-axis 93, respectively. Such an arrangement provides the unexpected and unpredictable advantage of independently using the portable second support section 21 to mount smaller and lighter equipment as well as adaptably combine with the portable first support section 20 to mount larger and heavier equipment. Furthermore, the axial alignment of the second wheels 38 ensures the second support section remains at a substantially stable position aligned with the horizontal plane and the central support beams 22, 23.

The invention may include a method of utilizing a scraper tractor stand 10 for supporting a heavy-duty equipment at an elevated position above a ground-surface during maintenance procedures. Such a method may include the chronological steps of: providing and positioning a plurality of linear central support beams 22, 23 underneath the heavy-duty equipment; providing and connecting a portable first support section 20 to a respective proximal end of each of the central support beams 22, 23; providing and registering a first cross-beam 24 along a first x-axis 90 defined at the proximal ends of the central support beams 22, 23.

Such a method may further include the chronological steps of: providing and connecting a portable second support section 21 to a respective distal end of each of the central support beams 22, 23; providing and registering a second cross-beam 25 along a second x-axis 91 defined at the distal ends of the central support beams 22, 23; fixedly connecting the first cross-beam 24 to the heavy-duty equipment; independently adjusting each of the first and second cross-beams 24, 25 along mutually exclusive first and second y-axes 92, 93 oppositely located at the proximal and distal ends of the central support beams 22, 23 respectively; and aligning the central support beams 22, 23 at a coplanar configuration and along a horizontal plane oriented perpendicular to the first and second y-axes 92, 93, respectively. The combination of such claimed elements provides an unpredictable and unexpected benefit of enabling a user to quickly and safely mount heavy-duty equipment on a sturdy and balanced scraper tractor stand 10, thereby increasing safety of mechanics performing maintenance and repair work on the heavy-duty equipment.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A scraper tractor stand for supporting a heavy-duty equipment at an elevated position above a ground-surface during maintenance procedures, said scraper tractor stand comprising:

a plurality of central support beams adapted to be positioned underneath the heavy-duty equipment;

a portable first support section connected to a respective proximal end of each of said central support beams, said first support section having a first cross-beam registered along a first x-axis defined at said proximal ends of said central support beams, said first cross-beam adapted to be fixedly connected to the heavy-duty equipment; and a portable second support section connected to a respective distal end of each of said central support beams, said second support section having a second cross-beam registered along a second x-axis defined at said distal ends of said central support beams;

wherein each of said first and second cross-beams are adjustable along first and second y-axes oppositely located at said proximal and distal ends of said central support beams respectively;

wherein said central support beams are aligned along a horizontal plane oriented perpendicular to said first and second y-axes respectively;

wherein said first portable support section comprises a plurality of first wheel brackets statically mated to said proximal ends of said central support beams;

a plurality of first wheels rotatably coupled to said first wheel brackets respectively;

a plurality of vertically oriented first linear shafts statically and fixedly mated to said first wheel brackets and extending vertically upwardly therefrom;

a plurality of mounting brackets adjustably coupled to said first linear shafts and situated therebetween respectively, said mounting brackets being selectively raised and lowered along said first y-axis; and a first support plate fixedly attached to a top surface of said first cross-beam;

wherein each of said mounting brackets comprises a body provided with a plurality of fingers vertically spaced therealong and protruding inwardly towards a center-point of said first cross-beam;

a plurality of fasteners penetrated through each of said fingers respectively; and a female base selectively positioned along a vertical longitudinal length of a corresponding one of said first linear shafts;

wherein each of said mounting brackets are independently adjusted along said corresponding first linear shafts.

2. The scraper tractor stand of claim 1, wherein central support beams comprise: first and second central support beams statically positioned along said horizontal plane while said first cross-beam is raised and lowered along said first y-axis.

3. The scraper tractor stand of claim 1, wherein said second support member comprises:

a plurality of primary linear leg members spaced apart and aligned parallel to said central support members respectively, said primary linear leg members being coupled to said central support members and being axially aligned therewith along corresponding linear paths respectively; and a secondary linear leg member intercalated between said primary linear leg members and registered orthogonal thereto respectively;

wherein said primary and secondary linear leg members are coplanar.

4. The scraper tractor stand of claim 3, wherein said second portable support section comprises:

a plurality of second wheel brackets statically mated to axially opposed ends of said primary linear leg members respectively;

a plurality of second wheels rotatably coupled to said second wheel brackets respectively;

a plurality of vertically oriented second linear shafts statically and fixedly mated to said primary leg members and extending vertically upward therefrom;

a second support plate fixedly attached to a top surface of said second linear leg member; and wherein said second cross-beam is vertically adjustable along respective longitudinal lengths of said second linear shafts and second said second y-axis respectively.

5. A scraper tractor stand for supporting a heavy-duty equipment at an elevated position above a ground-surface during maintenance procedures, said scraper tractor stand comprising:

a plurality of linear central support beams adapted to be positioned underneath the heavy-duty equipment;

a portable first support section connected to a respective proximal end of each of said central support beams, said first support section having a first cross-beam registered along a first x-axis defined at said proximal ends of said central support beams, said first cross-beam adapted to be fixedly connected to the heavy-duty equipment; and a portable second support section connected to a respective distal end of each of said central support beams, said second support section having a second cross-beam registered along a second x-axis defined at said distal ends of said central support beams;

wherein each of said first and second cross-beams are independently adjustable along mutually exclusive first and second y-axes oppositely located at said proximal and distal ends of said central support beams respectively;

wherein said central support beams are coplanar and aligned along a horizontal plane oriented perpendicular to said first and second y-axes respectively;

wherein said first portable support section comprises a plurality of first wheel brackets statically mated to said proximal ends of said central support beams;

a plurality of first wheels rotatably coupled to said first wheel brackets respectively;

a plurality of vertically oriented first linear shafts statically and fixedly mated to said first wheel brackets and extending vertically upwardly therefrom;

a plurality of mounting brackets adjustably coupled to said first linear shafts and situated therebetween respectively, said mounting brackets being selectively raised and lowered along said first y-axis; and a first support plate fixedly attached to a top surface of said first cross-beam;

wherein each of said mounting brackets comprises a body provided with a plurality of fingers vertically spaced therealong and protruding inwardly towards a center-point of said first cross-beam;

a plurality of fasteners penetrated through each of said fingers respectively; and a female base selectively positioned along a vertical longitudinal length of a corresponding one of said first linear shafts;

wherein each of said mounting brackets are independently adjusted along said corresponding first linear shafts.

6. The scraper tractor stand of claim 5, wherein central support beams comprise: first and second central support beams statically positioned along said horizontal plane while said first cross-beam is raised and lowered along said first y-axis.

7. The scraper tractor stand of claim 5, wherein said second support member comprises:

a plurality of primary linear leg members spaced apart and aligned parallel to said central support members respectively, said primary linear leg members being coupled to said central support members and being axially aligned therewith along corresponding linear paths respectively; and a secondary linear leg member intercalated between said primary linear leg members and registered orthogonal thereto respectively;

wherein said primary and secondary linear leg members are coplanar.

8. The scraper tractor stand of claim 7, wherein said second portable support section comprises:

a plurality of second wheel brackets statically mated to axially opposed ends of said primary linear leg members respectively;

a plurality of second wheels rotatably coupled to said second wheel brackets respectively;

a plurality of vertically oriented second linear shafts statically and fixedly mated to said primary leg members and extending vertically upward therefrom;

a second support plate fixedly attached to a top surface of said second linear leg member; and wherein said second cross-beam is vertically adjustable along respective longitudinal lengths of said second linear shafts and second said second y-axis respectively.

* * * * *